United States Patent
Lee et al.

(10) Patent No.: US 10,197,222 B2
(45) Date of Patent: Feb. 5, 2019

(54) SHUT-OFF DEVICE FOR PIPE

(71) Applicant: The Hong Kong and China Gas Company Limited, Hong Kong (CN)

(72) Inventors: Carson Wai Keung Lee, Hong Kong (CN); Chun Yiu Ho, Hong Kong (CN)

(73) Assignee: The Hong Kong and China Gas Company Limited, Hong Kong SAR (CN)

( * ) Notice: Subject to any disclaimer, the term of this patent is extended or adjusted under 35 U.S.C. 154(b) by 9 days.

(21) Appl. No.: 15/429,240

(22) Filed: Feb. 10, 2017

(65) Prior Publication Data

US 2017/0350560 A1    Dec. 7, 2017

(30) Foreign Application Priority Data

Jun. 3, 2016   (HK) .................................... 16106361

(51) Int. Cl.
*F16K 24/04* (2006.01)
*F16K 3/18* (2006.01)
(Continued)

(52) U.S. Cl.
CPC .............. *F17D 5/005* (2013.01); *F16K 17/36* (2013.01); *F16K 24/048* (2013.01); *F16K 31/18* (2013.01);
(Continued)

(58) Field of Classification Search
CPC ........ F16K 3/0236; F16K 3/029; F16K 3/182; F16K 24/042; F16K 24/048; F16K 24/06; F16K 31/24; F16K 31/26; F16K 31/265; F16K 31/30; F16K 31/18; F16K 31/20; F16K 33/00; F16K 3/10; F16K 3/14;
(Continued)

(56) References Cited

U.S. PATENT DOCUMENTS

| | | | | |
|---|---|---|---|---|
| 507,211 A | * | 10/1893 | Burrows ................. | G01F 23/34 137/213 |
| 626,152 A | * | 5/1899 | Eaton ..................... | B60K 15/00 137/388 |
| 2,404,795 A | | 7/1946 | Garretson | |
| 2,679,863 A | * | 6/1954 | Tucker ..................... | A01K 7/04 137/451 |

(Continued)

FOREIGN PATENT DOCUMENTS

FR       503889 A  *  6/1920  ............. F16K 3/182
GB     1 531 083        11/1978

OTHER PUBLICATIONS

Intellectual Property Office; Search Report in GB Patent Application No. GB1701965.4 (dated Mar. 10, 2017).

*Primary Examiner* — Reinaldo Sanchez-Medina
*Assistant Examiner* — Hailey K Do
(74) *Attorney, Agent, or Firm* — Leydig Voit and Mayer

(57) ABSTRACT

A shut-off device for a pipe in a pipeline and responsive to ingress of water, has at least two valves for installation in the pipe of the pipeline. Each valve has a valve member supported for movement between an open position when the valve is open for passage of a fluid through the pipe, and a closed position when the valve is closed for preventing passage of the fluid through the valve. The device includes a buoyant member associated with the valve members for causing movement of the valve members to the closed positions upon ingress of water to the buoyant member. The valve members are moved to the closed positions in respective upstream and downstream directions of passage of the fluid through the pipe.

30 Claims, 18 Drawing Sheets

(51) Int. Cl.
  *F16K 31/18* (2006.01)
  *F16K 31/20* (2006.01)
  *F17D 5/00* (2006.01)
  *F16K 17/36* (2006.01)
  *F17D 1/04* (2006.01)

(52) U.S. Cl.
  CPC ............... *F16K 31/20* (2013.01); *F17D 1/04* (2013.01); *F16K 3/182* (2013.01)

(58) Field of Classification Search
  CPC ... F16K 3/16; F16K 3/18; F16K 3/183; F16K 3/184; F16K 3/186; F16K 3/207; Y10T 137/7365; Y10T 137/7468; Y10T 137/7423; Y10T 137/7475; Y10T 137/7485; Y10T 137/3099; Y10T 137/88062
  See application file for complete search history.

(56) References Cited

U.S. PATENT DOCUMENTS

| | | | | |
|---|---|---|---|---|
| 2,977,972 | A * | 4/1961 | Billeter | F16K 24/042 |
| | | | | 137/202 |
| 3,259,142 | A * | 7/1966 | Richards | F16K 31/18 |
| | | | | 137/202 |
| 3,741,234 | A * | 6/1973 | Siebold | B01D 19/0063 |
| | | | | 137/202 |
| 3,782,406 | A * | 1/1974 | Siebold | F16K 31/18 |
| | | | | 137/202 |
| 5,031,655 | A | 7/1991 | Hebaus | |
| 8,939,432 | B1 * | 1/2015 | Tan | F16K 3/186 |
| | | | | 251/197 |
| 9,377,125 | B2 | 6/2016 | Lee et al. | |
| 2006/0033061 | A1 * | 2/2006 | van Mast | B01J 3/03 |
| | | | | 251/93 |
| 2007/0075288 | A1 * | 4/2007 | Matte | F16K 3/186 |
| | | | | 251/167 |

* cited by examiner

SHUT-OFF DEVICE FOR PIPE

The present invention relates to a shut-off device for pipe for use in a pipeline for operation in response to ingress of water.

BACKGROUND OF THE INVENTION

Pipelines or pipe networks for transmission and supply of gaseous fuels, such as town gas or natural gas, are often built underground. They are vulnerable to ingress of water in the case of accidents (e.g. leakage caused by nearby underground work and in particular damage by impinging water jets from burst water mains) or unexpected circumstances (e.g. soil/earth movement, and cracking or faulty condition of pipe fittings). Underground water leaking into the system may find its way spreading very quickly over a long distance down the pipeline. Such water will take considerable time to clear, subsequent to rectification of the leak or faulty condition. To worsen the problems, water carrying soil or dirt, etc. may reach and foul or cause damage to gas equipment/apparatus at the customers' premises.

As present, measures safeguarding or catering for the ingress of water into underground pipelines are rare or impractical.

The invention seeks to eliminate or at least to mitigate such a problem by providing a new or otherwise improved shut-off device for pipe for use in a pipeline for operation in response to ingress of water.

SUMMARY OF THE INVENTION

According to the invention, there is provided a shut-off device for pipe for use in a pipeline for operation in response to ingress of water, comprising at least two valves for installation in a pipe of a said pipeline. Each valve comprises a valve member supported for movement between an open position when the valve is open to permit passage through a said pipe and a closed position when the valve is closed to shut off the passage through a said pipe. Included is a buoyant member associated with the valve members for causing movement of the valve members to their closed position automatically in the presence of ingress water in the vicinity of the buoyant member. The valve members are arranged in their closed positions to act in respective upstream and downstream directions of the passage through a said pipe.

Preferably, at least one of the valve members is arranged, upon movement from the open position to the closed position, to move into the passage through a said pipe.

More preferably, at least one of the valve members is arranged to stay clear of the passage through a said pipe when it is in the open position.

It is preferred that at least one of the valve members is arranged to move initially along a linear path from the open position and subsequently along a non-linear path to reach the closed position.

It is preferred that at least one of the valve members has a planar body and is arranged, in the open position, to extend transverse to the direction of the passage through a said pipe and, in the closed position, to extend transverse to the direction of the passage through a said pipe.

It is further preferred that the planar body of said at least one of the valve members is arranged to extend at a constant angle perpendicular to the direction of the passage through a said pipe.

Preferably, each valve member normally stays in the open position and is adapted to return automatically to the open position upon removal of said ingress water.

Preferably, at least one of the valve members is connected by means of a movable connector to the buoyant member and has its entire weight supported by the buoyant member.

In a preferred embodiment, the shut-off device includes a base below which the buoyant member is located for, upon floating on said ingress water, moving upwards to urge the connector against the base to cause movement of the connector and in turn movement of said at least one valve member to the closed position.

More preferably, said at least one valve member is arranged initially to move upwardly with the buoyant member from the open position and subsequently, upon the connector being urged against the base, to move outwardly relative to the buoyant member and to reach the closed position.

More preferably, the movable connector comprises at least one link pivotally connecting the valve member to the buoyant member for movement relative to the buoyant member.

Further more preferably, the movable connector includes two said links arranged to form a parallel linkage adapted to fix the angular position of the valve member in motion relative to the buoyant member.

Further more preferably, the link or at least one of the links has an actuating part arranged to be urged against the base to cause movement of the link or links and in turn movement of the valve member relative to the buoyant member and to reach the closed position.

Yet further more preferably, the actuating part is provided by an integral part of the link or said at least one of the links.

It is preferred that the base has an abutment against which the connector is to be urged by the buoyant member floating on said ingress water, and includes a guide adapted to guide the movement of the buoyant member floating on said ingress water.

It is further preferred that the buoyant member is in sliding engagement with the guide for guiding thereby.

It is further preferred that the buoyant member has a buoyant body including a mount with which the guide is in sliding engagement for guiding the buoyant member.

It is yet further preferred that the guide comprises a plurality of vertical rails, and the mount has respective parts in sliding engagement with the rails.

Preferably, the buoyant member has a buoyant body including a mount with which the connector is pivotally connected for movement relative to the buoyant member.

It is preferred that the valves include respective valve seats from which the corresponding valve members disengage in the open position and with which the valve members engage in the closed position.

In a preferred embodiment, the valves include respective valve seats from which the corresponding valve members disengage in the open position and with which the valve members engage in the closed position, the valve seats being connected with the base.

More preferably, the valve seats are connected at equiangular positions around the base.

More preferably, the valve seats are adapted to be connected with a said pipe at respective upstream and downstream positions thereof, to provide immovable support for the base and in turn sliding support for the buoyant member.

It is preferred that the valve member and the valve seat of each valve have respective sealing parts for inter-engagement to close the valve, and at least one of the sealing parts is provided with a magnet or magnets for magnetic attraction with the other sealing part to hold the valve member in the closed position.

In a preferred embodiment, The shut-off device includes a housing in which said at least two valves and the buoyant member are installed, the housing having at least two openings for connection in a said pipe to face upstream and downstream directions of the passage through a said pipe.

More preferably, the openings include or are provided with respective valve seats of the valves for co-operation with the valve members to control (shut off) the passage through each opening.

More preferably, each opening includes or is provided with respective pipe jointing means for connection in a said pipe.

More preferably, the housing has a main chamber for acting as part of the passage through a said pipe and includes a bottom chamber immediately underneath the main chamber, accommodating the buoyant member and at least part of the valve members and for collecting ingress water, and the buoyant member is arranged to float on collected ingress water initially to move the valve members out of the bottom chamber and finally to cause movement of the valve member to the closed position.

Further more preferably, the bottom chamber has a lower part which is openable for removal of ingress water collected in the bottom chamber.

It is preferred that the shut-off device is a self-contained unit for connection and use in a said pipe.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
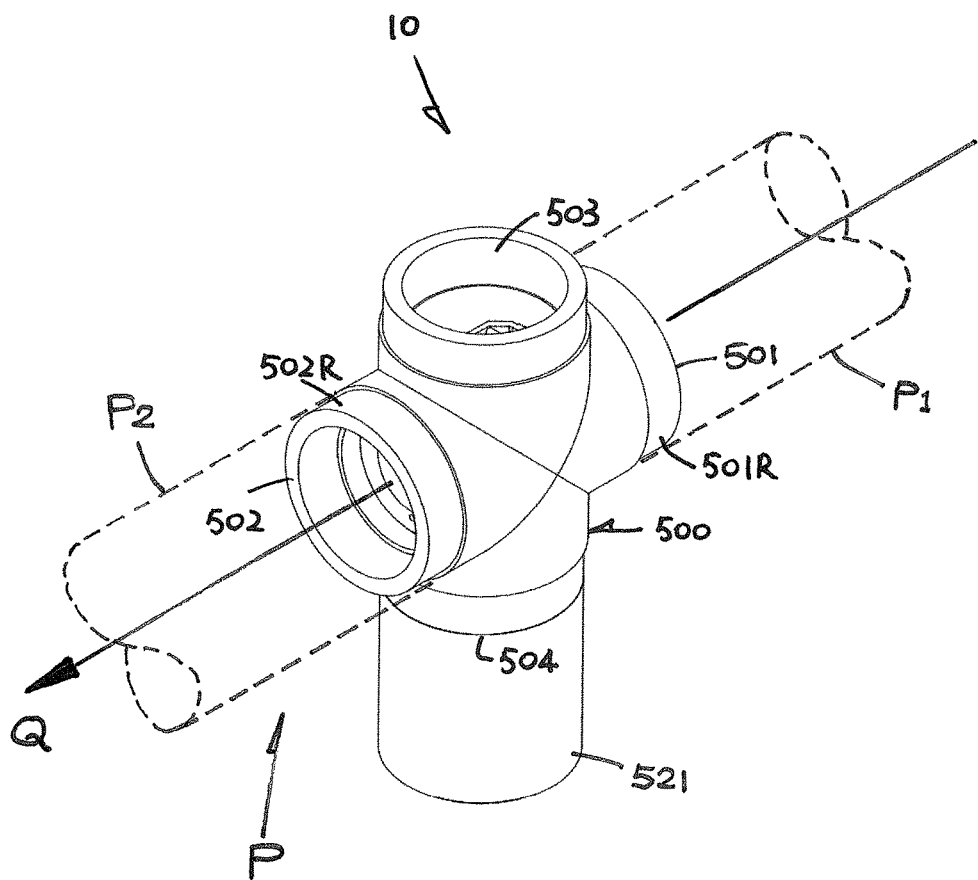
FIG. 1 is a perspective view of an embodiment of a shut-off device for pipe in accordance with the invention.
Figure 2:
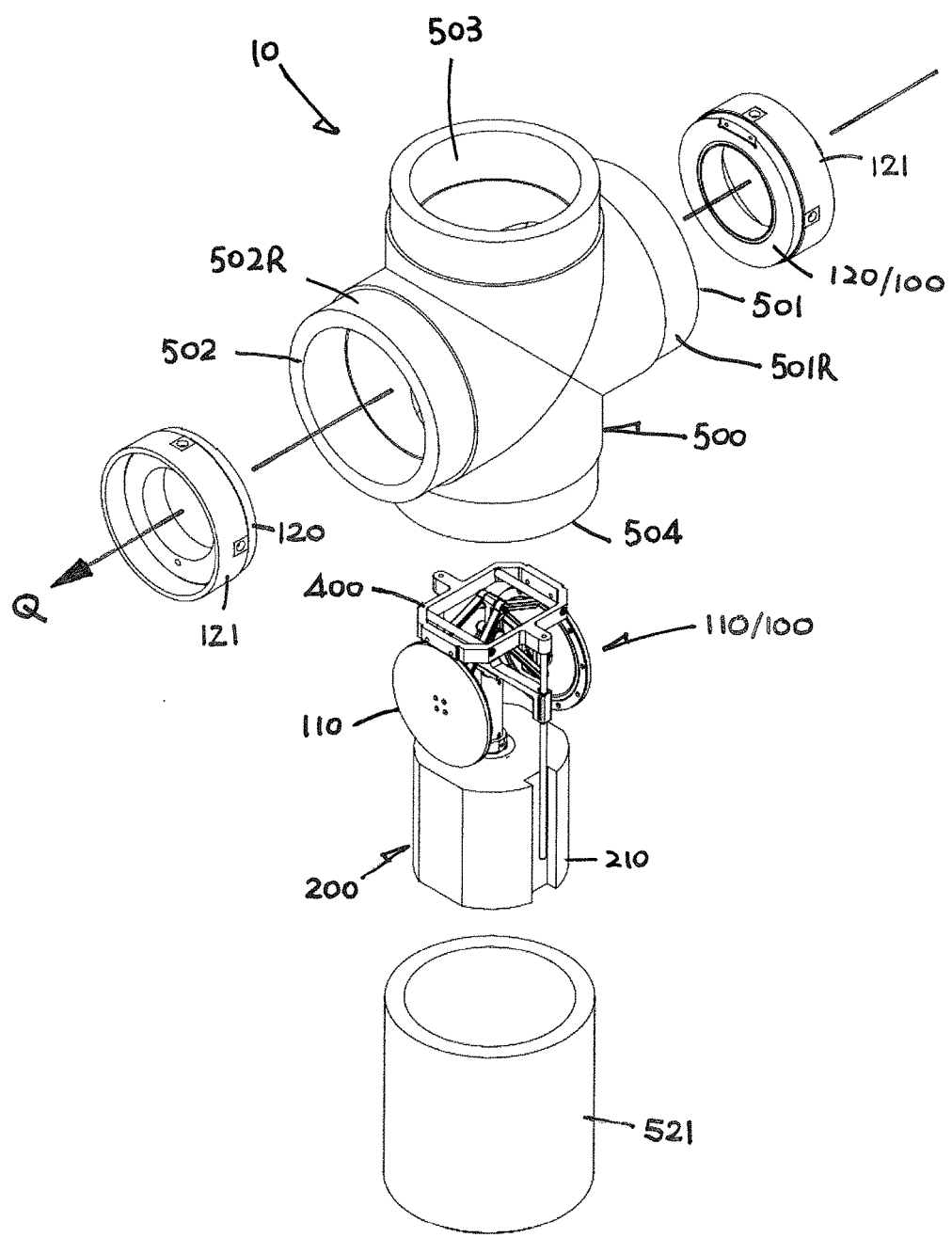
FIG. 2 is a perspective view of the shut-off device of FIG. 1, showing its major parts taken out from a housing.
Figure 3:
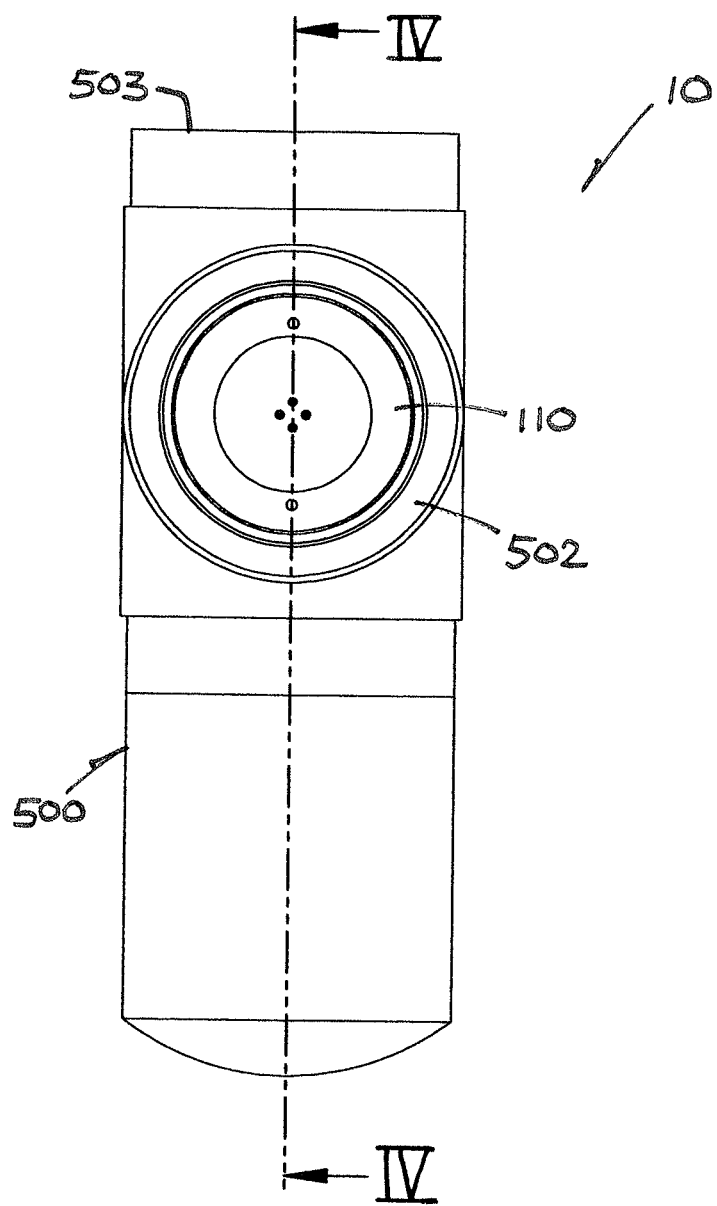
FIG. 3 is a side view of the shut-off device of FIG. 1.
Figure 4:
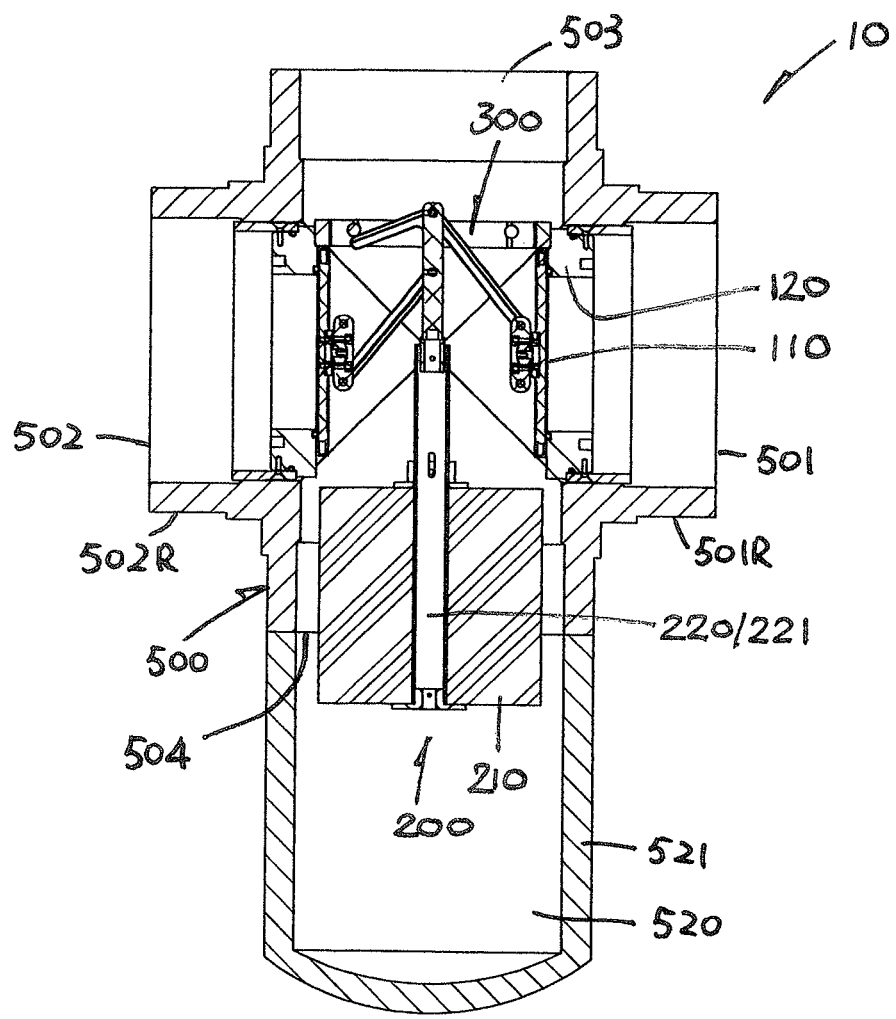
FIG. 4 is a cross-sectional view of the shut-off device of FIG. 3, taken along line IV-IV.
Figure 5:
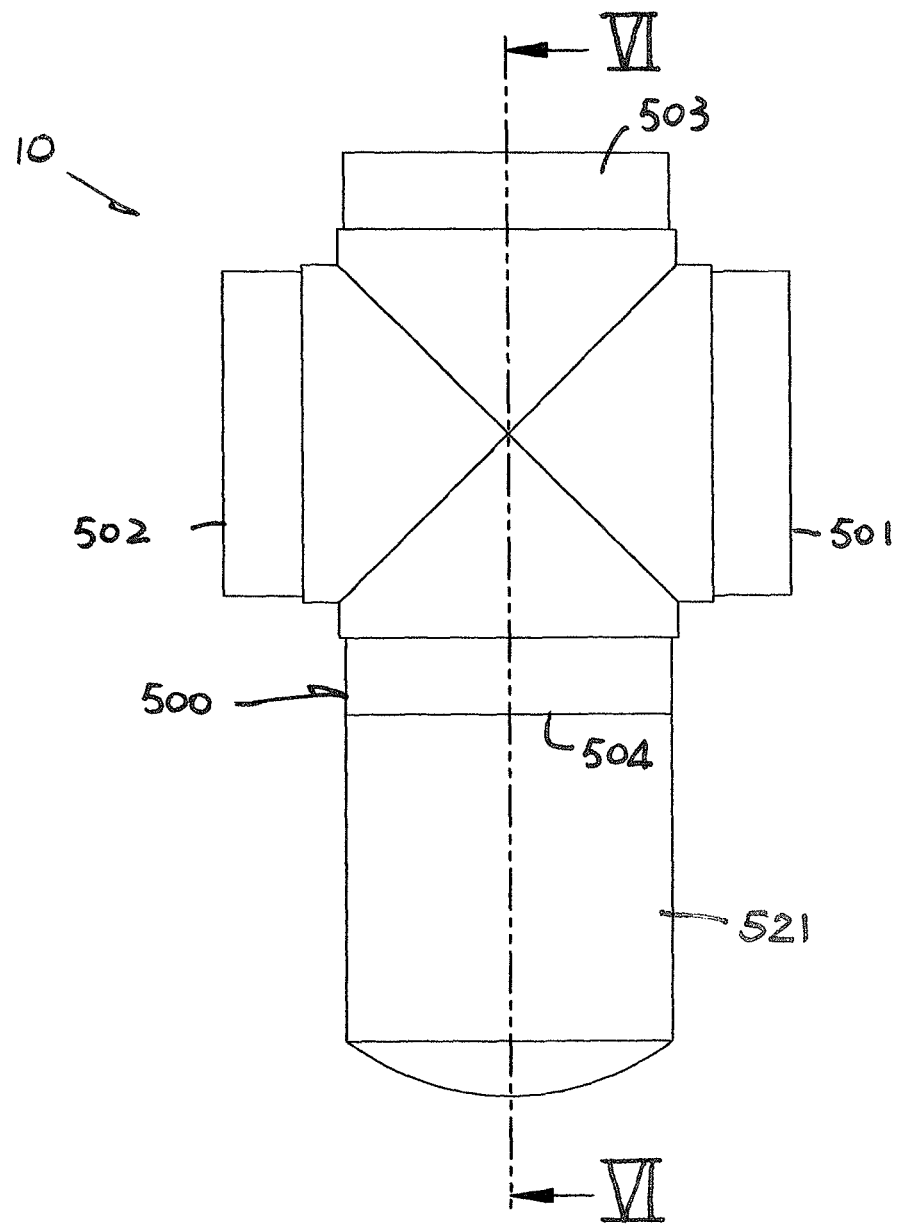
FIG. 5 is a front view of the shut-off device of FIG. 1.
Figure 6:
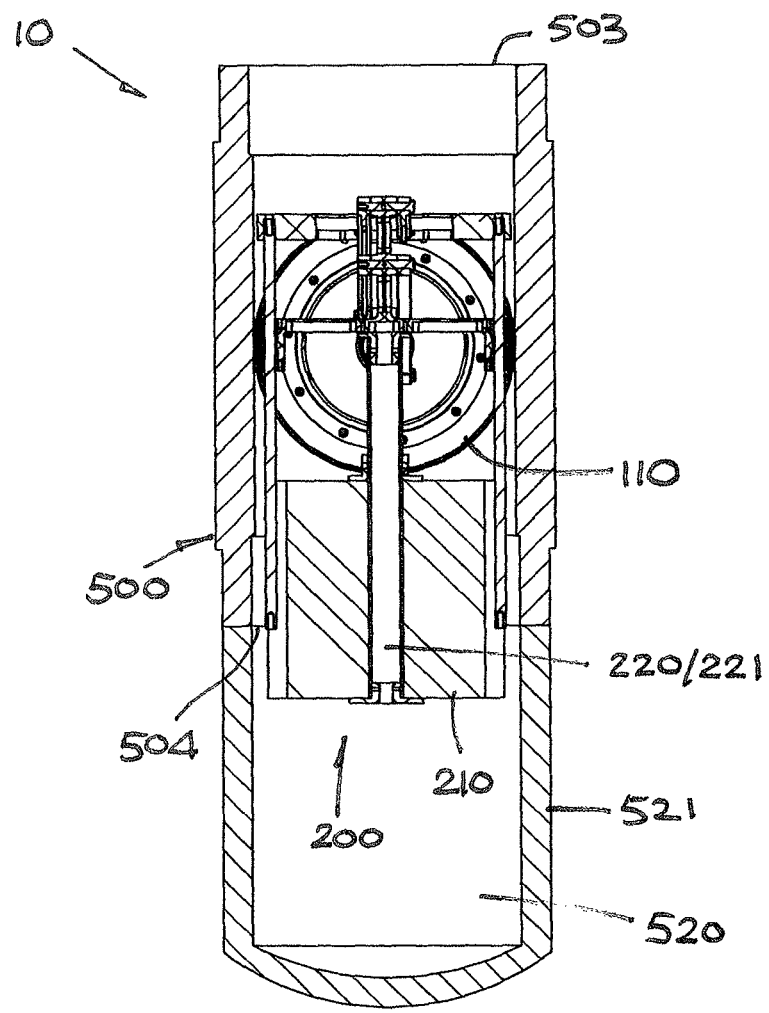
FIG. 6 is a cross-sectional view of the shut-off device of FIG. 5, taken along line VI-VI.
Figure 7:
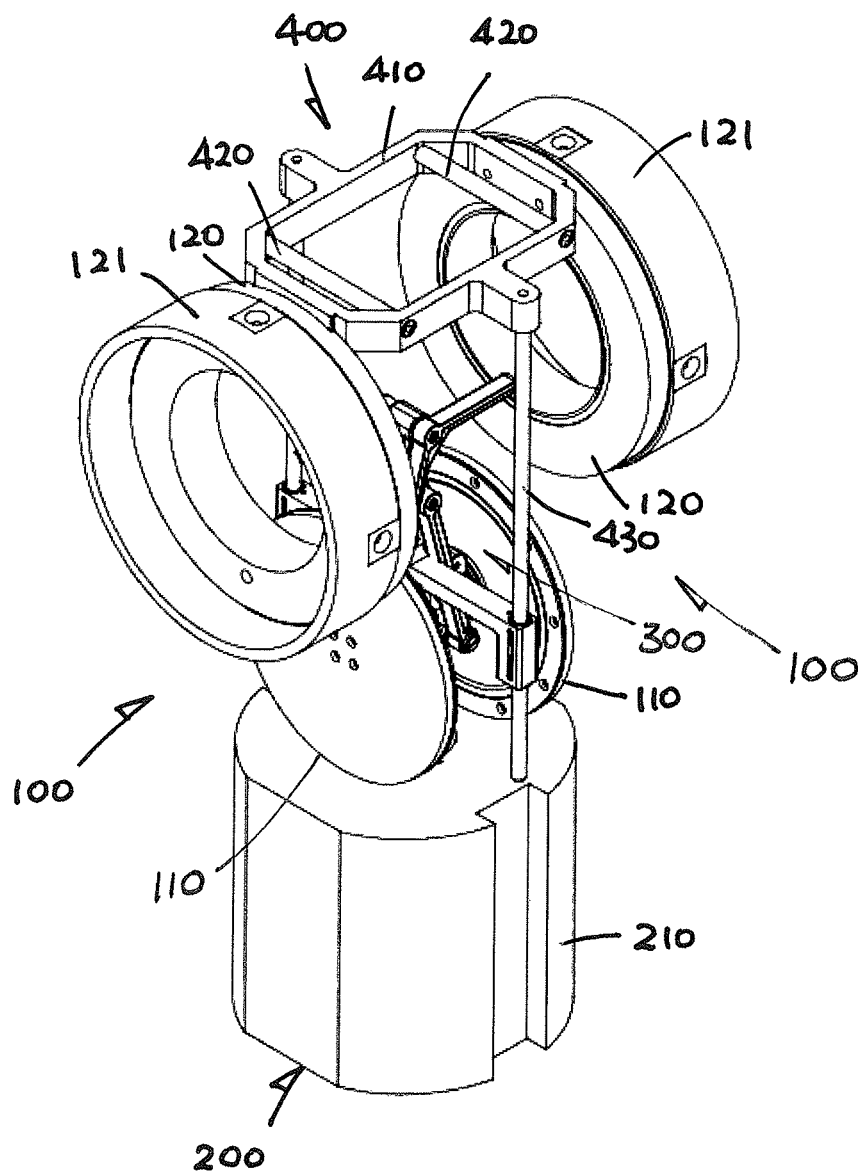
FIG. 7 is a perspective view of the shut-off device's major parts of FIG. 2.
Figure 8:
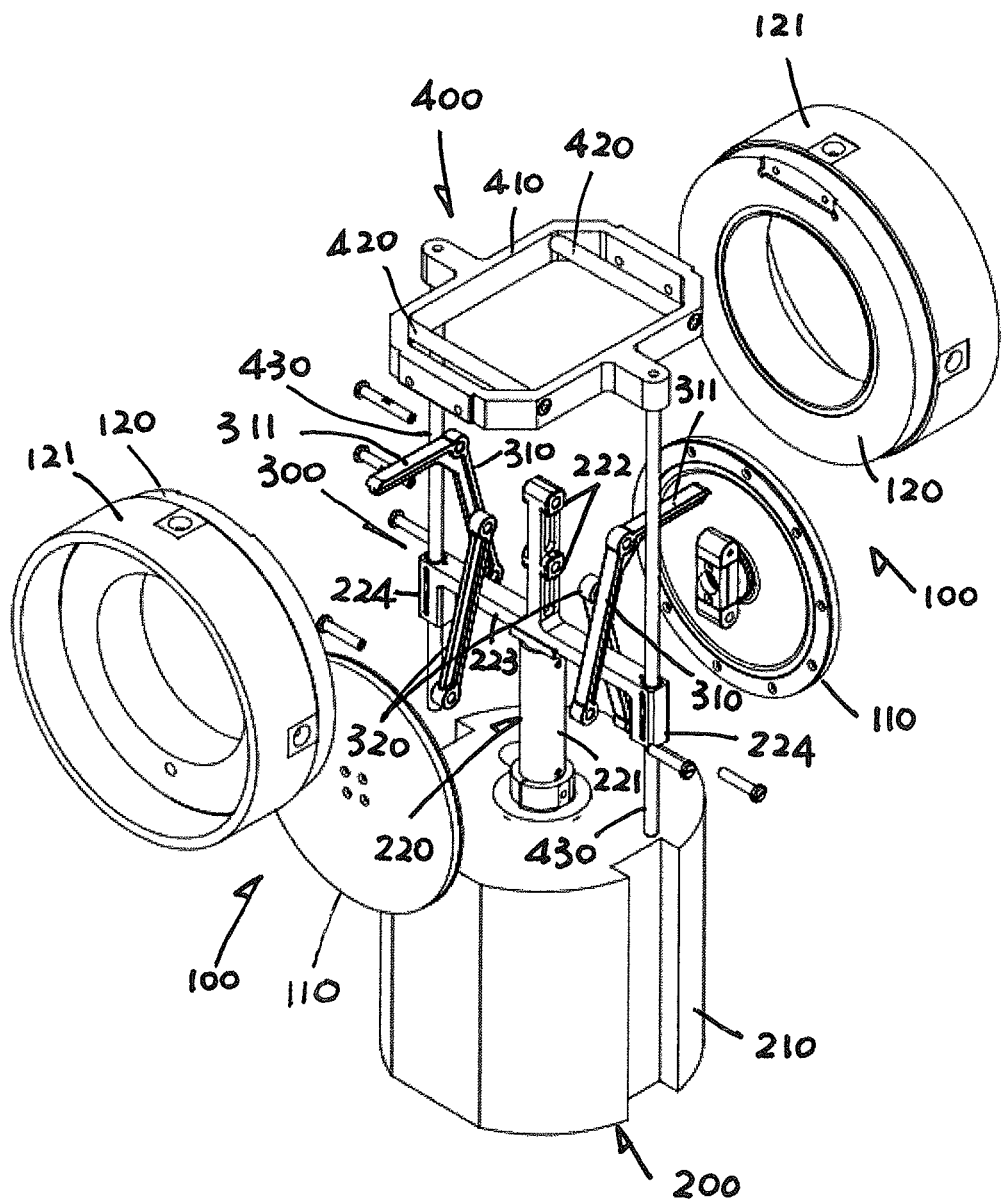
FIG. 8 is an exploded perspective view of the shut-off device's major parts of FIG. 7.
Figure 9:
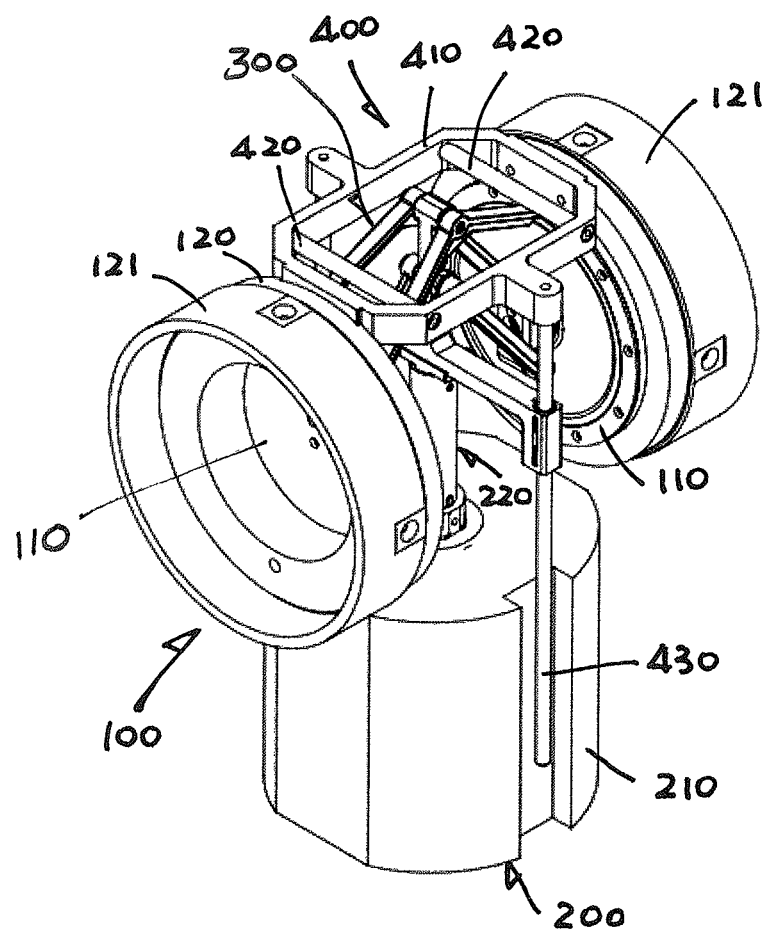
FIG. 9 is another perspective view of the shut-off device's major parts of FIG. 2.
Figure 10:
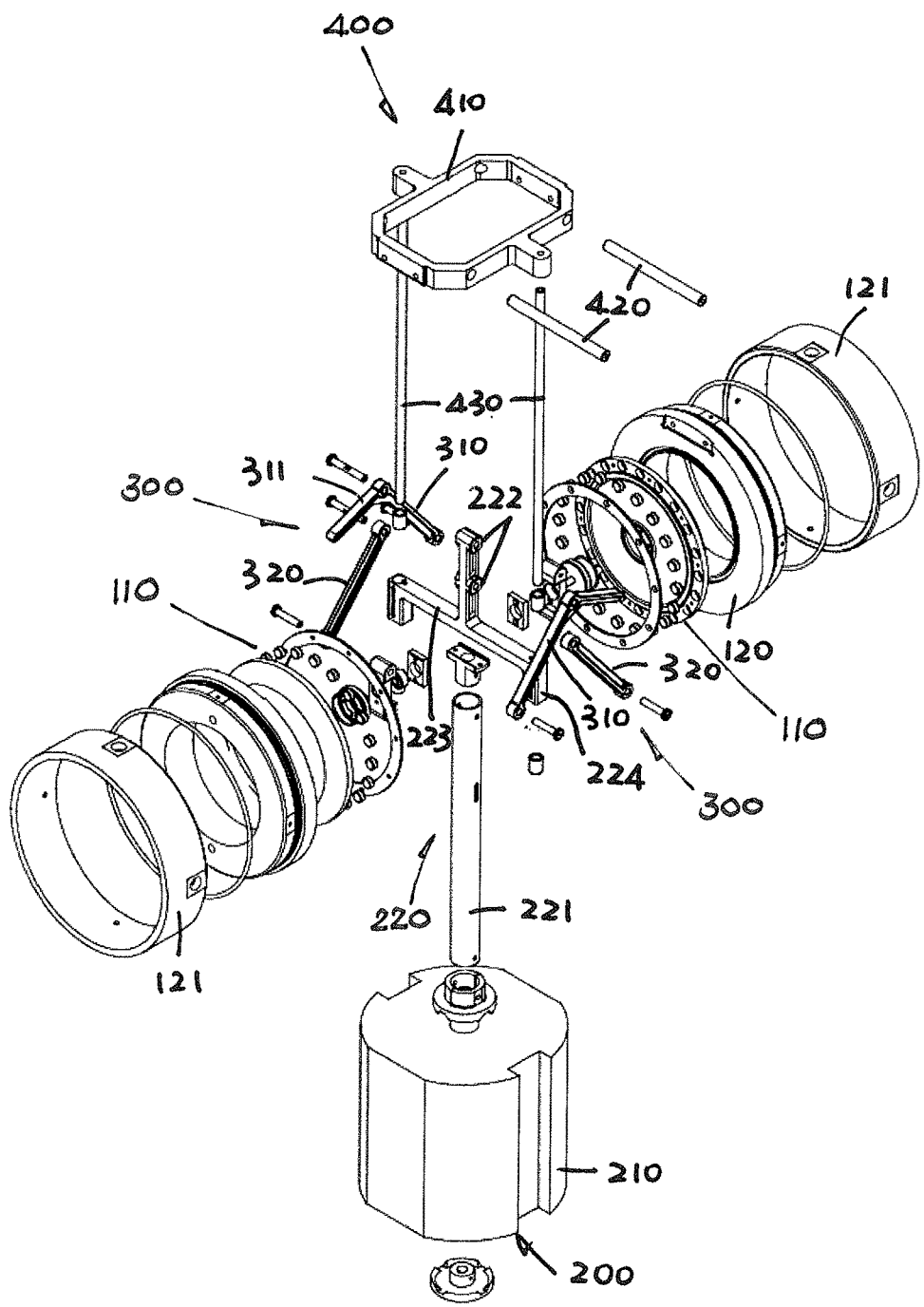
FIG. 10 is an exploded perspective view of the shut-off device's major parts of FIG. 9.
Figure 11:
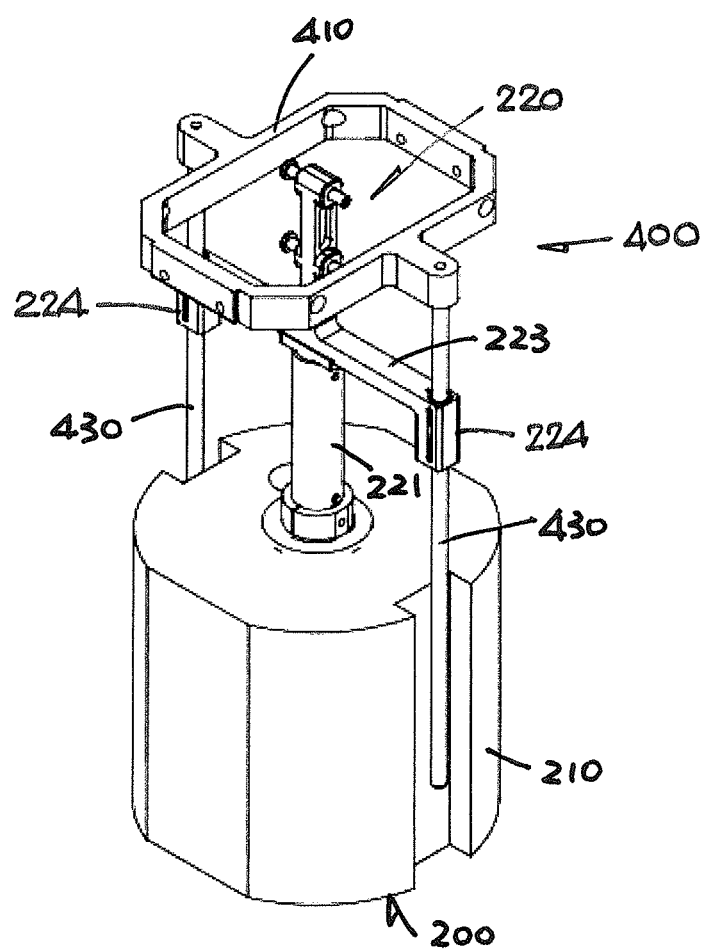
FIG. 11 is a perspective view of a buoyant member and base of the shut-off device of FIG. 2.
Figure 12:
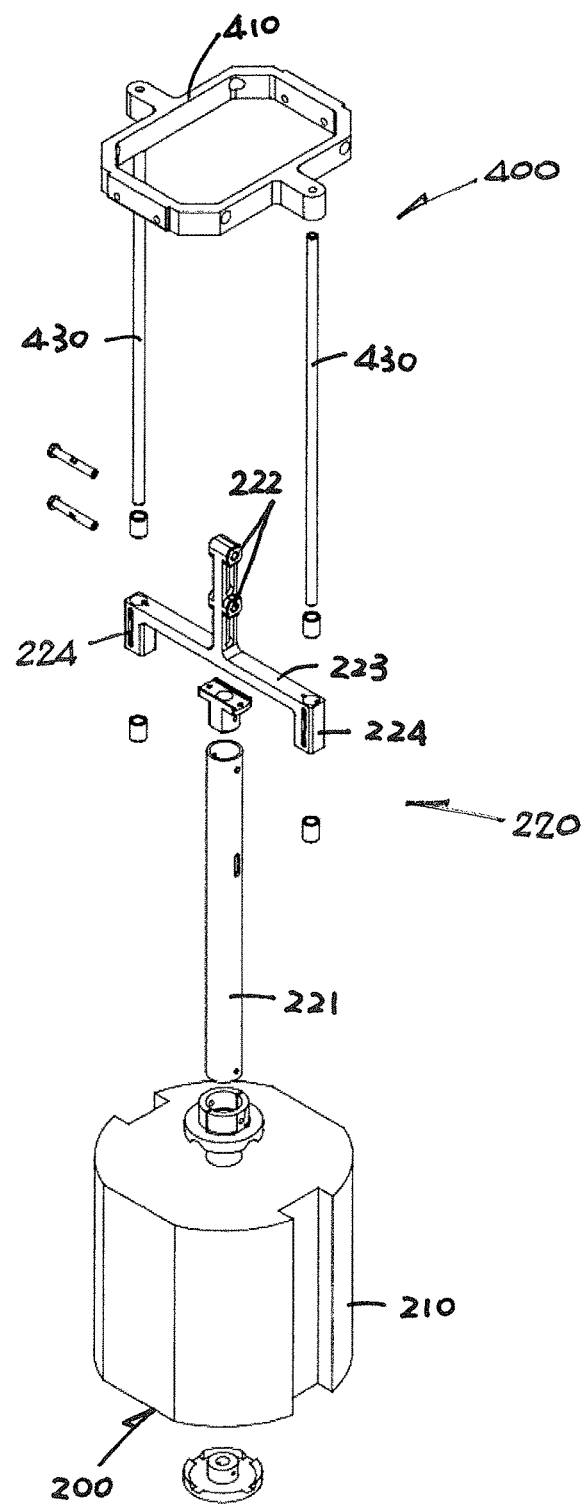
FIG. 12 is an exploded perspective view of the buoyant member and base of FIG. 11.
Figure 13:
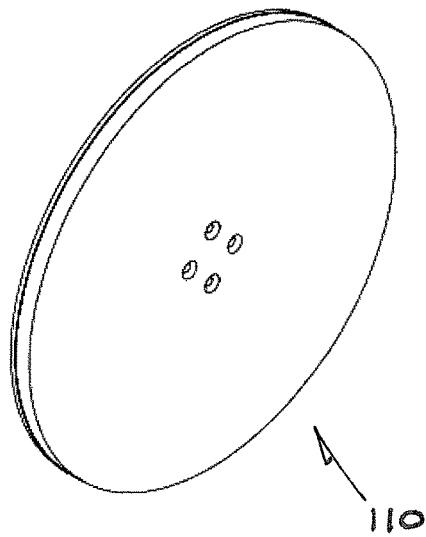
FIGS. 13 and 14 are front and rear perspective views of a valve member of the shut-off device of FIG. 2.
Figure 14:
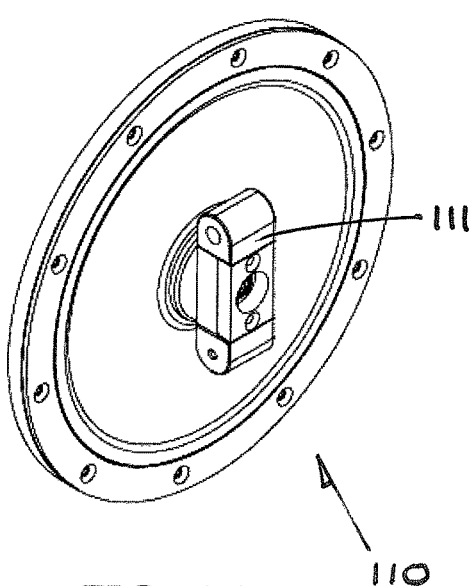
Figure 15:
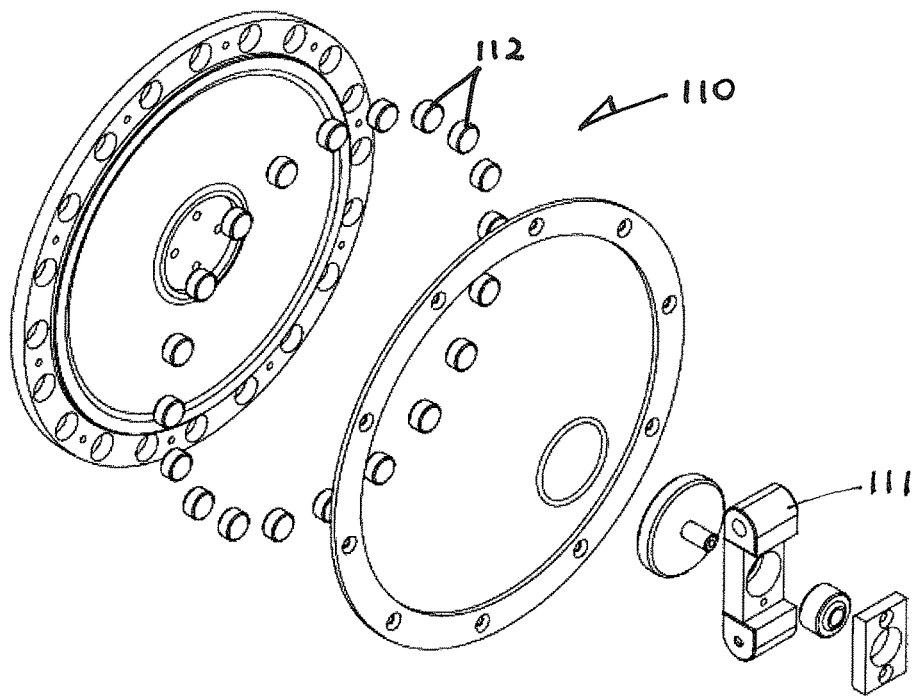
FIG. 15 is an exploded perspective view of the valve member of FIGS. 13 and 14.
Figure 16:
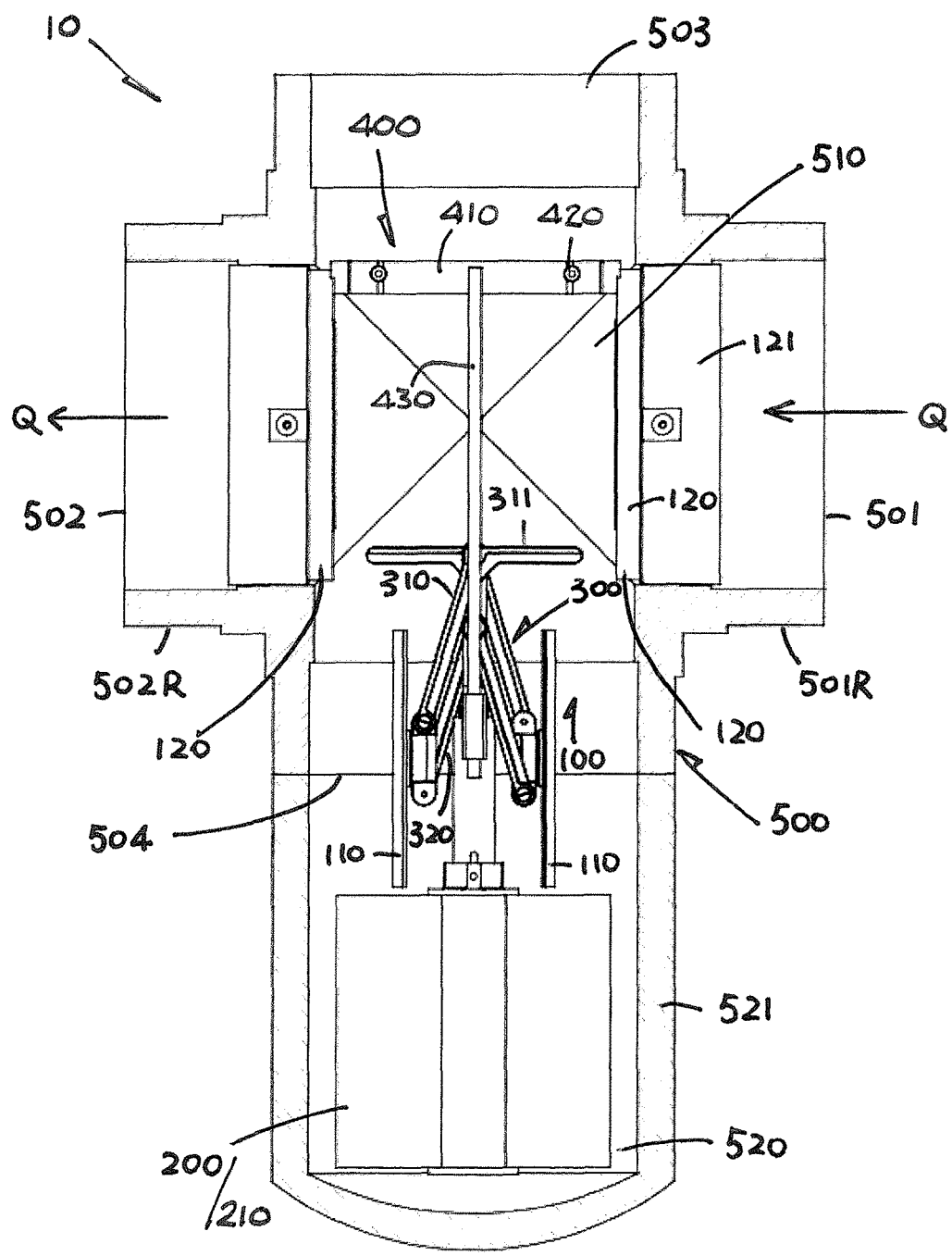
FIGS. 16 to 20 are cross-sectional front views of the shut-off device of FIG. 1, showing its sequential operating conditions from open to closed.
Figure 17:
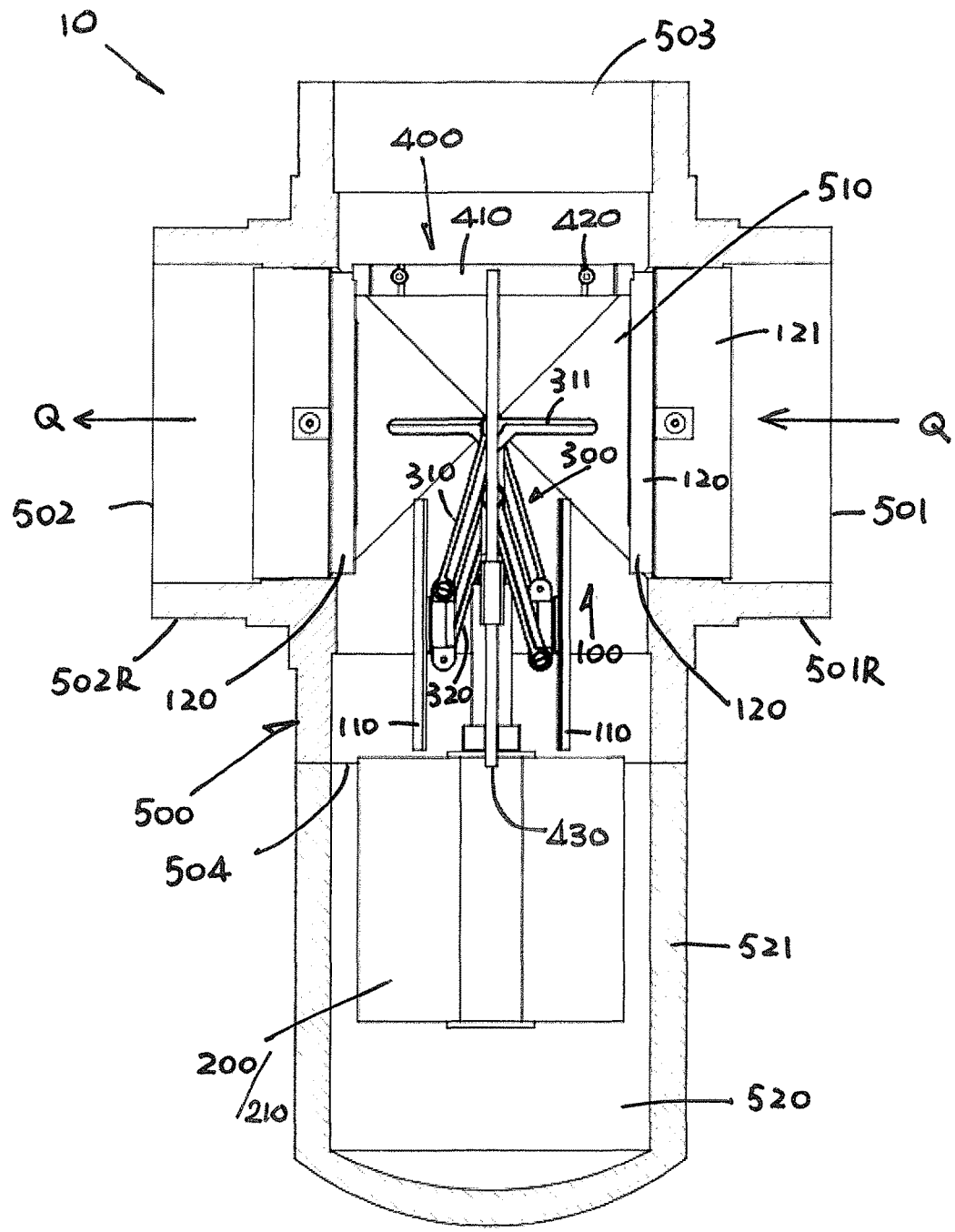

Referring initially to FIGS. 1 to 16 of the drawings, there is shown a shut-off device 10 for pipe, embodying the invention, for use in a pipeline for operation in response to ingress of water into the pipeline. The pipeline is laid for the supply of fuel gas from the gas production plant and/or storage of a gas company to customers at a specific supply location or zone protected by the shut-off device 10. The shut-off device 10 includes at least two valves 100 installed in a pipe P of the pipeline and a buoyant member 200 for operating the valves 100.

The pipe P has two adjoining sections P1 and P2, between which the shut-off device 10 is connected and ideally at a lowermost position of the pipe P or preferably the entire pipeline. The pipe P delivers fuel gas along a passage Q therethrough in a direction from the first section P1 to the second section P2, i.e. the downstream direction, with the opposite direction being the upstream direction.

The two valves 100 preferably share the same construction, each comprising a valve member 110 supported for movement between an open position (FIG. 7) in which the valve 100 is open to permit passage Q through the pipe, and a closed position (FIG. 9) in which the valve 100 is closed to shut off the passage Q. The buoyant member 200 is associated with the valve members 110 for causing movement of the valve members 110 to their closed position automatically in the presence of ingress water in the vicinity of the buoyant member 200, when such water leaking into the pipe P builds up to a sufficient amount.

The valve members 110 are oriented in opposite directions and are arranged in their closed position to act in respective upstream and downstream directions of the passage Q through the pipe P, such that the shut-off device 10 will shut off the pipe P in opposite directions and with the use of two valves 100. This will result in effective sealing.

The buoyant member 200 may be associated with the valve members 110 in a number of possible ways for relative movement to cause or result in movement of the valve members 110. In this particular embodiment, each of the valve members 110 is connected by means of a respective movable connector 300 to the buoyant member 200 and, in particular, has its entire weight supported or borne by the buoyant member 200.

The specific construction of the shut-off device 10 of this particular embodiment is now described in detail. It has a housing 500 (made of any suitable material e.g. polyethylene or cast iron) in which the valves 100 and the buoyant member 200 are installed. The housing 500 has opposite right and left cylindrical openings 501 and 502 which act as inlet and outlet respectively, for connection in the pipe P to face upstream and downstream directions of the passage Q through the pipe P. The openings 501 and 502 include pipe jointing means in the form of respective integral rims 501R and 502R, by means of which the shut-off device 10 is to be connected or jointed in the pipe P between the pipe sections P1 and P2 for use. The housing 500 includes upper and lower openings 503 and 504 that are likewise cylindrical.

Internally, the housing 500 defines a main chamber 510, which acts as part of the passage Q through the pipe P, and a bottom chamber 520 immediately underneath the main chamber 510 and accommodating the buoyant member 200 and at least part of the valve members 110. The main chamber 510 has a generally cylindrical shape and is in axial alignment with, and of the same cross-sectional size or footprint as, the inlet/outlet or upstream/downstream openings 501 and 502 on opposite sides thereof, together forming a linear through passage Q. The bottom chamber 520 is situated immediately underneath the passage Q.

Each valve member 110 has a circular planar body with a connector 111 at the centre on the back. Each valve 100 includes a valve seat 120 for co-operation with the associated valve member 110, from which the valve member 110 disengages in the open position and with which the valve member 110 engages in the closed position. The valve seat 120 is of an annular configuration and includes a short cylindrical base collar 121 which is connected with, by being inserted into, the respective upstream/downstream opening 501/502 on or within the inner side of the opening 501/502 facing the main chamber 510 of the housing 500.

Generally stated, the valve seats 120 are adapted to be connected with and inside the pipe P, at respective upstream and downstream positions thereof. The two valve seats 120 face each other in opposite directions diametrically across the housing's main chamber 510. The upstream and downstream openings 501 and 502 include or are provided with the corresponding valve seats 120 of the valves 100 for co-operation with the valve members 110 to control, and in particular to shut off, the passage Q through each opening 501/502.

Each valve member 110 and the associated valve seat 120 have respective generally planar sealing parts or surfaces for inter-engagement, i.e. bearing against each other, to close the associated valve 100. To enhance the sealing effect, at least one of the sealing parts or the sealing part of each valve member 110 in this particular embodiment is provided with an annular series of magnets 112 (or a ring-shaped magnet). The magnets 112 provide magnetic attraction with the other sealing part of the valve seat 120 for holding or maintaining the valve member 110 more firmly in the closed position, when the valve 100 is closed.

The bottom chamber 520 accommodates the buoyant member 200, and is arranged to collect water that leaks into the pipe P. The main chamber 510 is accessible from outside the housing 500 via the upper opening 503, which is normally closed or sealed off by means of a round cap (not shown). The bottom chamber 520 is provided by the space within the lower opening 504 and, to a much larger extent, by the cavity of a cylindrical cap 521 that is the lowest part and closes the lower opening 504 from below. The cap 521 may be secured with the lower opening 504 by being screwed on or by bolts or by welding (as in the described embodiment) or epoxy resin. The cap 521 may, if desired, be detachable or removable for draining of water collected in the bottom chamber 520, or for maintenance purposes.

The bottom chamber 520 is the lowermost part of the housing 500 and is located at the lowermost position of the pipe P or preferably the entire pipeline, with the result that water leaking into the pipeline at any positions will flow into the pipe P and be collected in the bottom chamber 520. The buoyant member 200 is arranged to float on ingress water collected in the bottom chamber 520 initially to move the valve members 110 out of the bottom chamber 520 and finally to cause movement of the valve members 110 to the closed position.

The buoyant member 200 has a generally cylindrical buoyant body 210 and includes a mount 220 fixed on the buoyant body 210. The buoyant body 210 may be a hollow plastic structure or made of polystyrene material. The mount 220 has a vertical shaft 221 projecting up co-axially from the buoyant body 210 and includes a horizontal beam 223 that intersects with the shaft 221. The upper end of the shaft 221 is formed with a pair of upper and lower horizontally-extending holes 222 for pivotally connecting the movable connectors 300 such that the movable connectors 300 are movable relative to the buoyant member 200. Opposite left and right ends of the beam 223 are each made to be in the form of a vertically-extending small tube 224 for use in guiding of the vertical movement of the buoyant member 200.

Each movable connector 300 comprises two, first and second links 310 and 320, both pivotally connecting the respective valve member 110 to the buoyant member 200 for movement relative to the buoyant member 200. The links 310 and 320 are connected with their inner ends hinged to the upper and lower holes 222 respectively of the mount 220 and their outer ends hinged to respective upper and lower holes in the central back connector 111 of the valve member 110.

The two links 310 and 320 are arranged and connected to form a parallel linkage (or parallelogram linkage) adapted to fix the angular position of the valve member 110 in motion relative to the buoyant member 200. By being a parallel linkage, the two links 310 and 320 are of equal length and extend in parallel with each other, such that the valve member 110 is pivotable at a constant angular position relative to the buoyant member 200.

With the buoyant member 200 placed upright i.e. having a vertical central axis, both valve members 110 are kept during movement by the buoyant member 200 to stay constantly at a vertical position relative to the buoyant member 200. Generally stated, all these three members 200 and 110 extend upright during operation or at rest, when installed for use.

In passing, the first link 310 of each movable connector 300 has, at its upper end, an integral extension which projects at an angle of about 70° from the main body of the link 310 and acts as an actuating part 311 by means of which the movable connector 300 is set into movement or motion, as described below.

The shut-off device 10 further includes a base 400 having a horizontal rectangular frame-like body 410, below which the buoyant member 200 is located. Upon floating on ingress water being collected in the bottom chamber 520 of the housing 500, the buoyant member 200 will gradually move upwards to eventually urge the movable connectors 300 against the base 400 to thereby cause movement of the connectors 300 and in turn movement of the valve members 110 to the closed position.

The base 400 has two horizontal pins 420 at opposite ends of and extending across the plane of the body 410. Each pin 420 acts as an abutment against which the respective movable connector 300 is to be urged by the buoyant member 200 upon floating and rising on the ingress water in the housing's bottom chamber 520.

The base 400 includes a guide as provided by a pair of vertical rails 430, which extend downwardly from opposite sides of the body 410 and are adapted to guide the up and down movement of the buoyant member 200. More specifically, the rails 430 extend through respective tubes 224 of the mount 220, such that the tubes 224 are in sliding engagement with and along the respective rails 430. With this arrangement, the overall buoyant member 200 is in sliding engagement with the rails 430 for guiding by the rails 430, i.e. the guide, to rise on the ingress water being collected or fall with the ingress water as the latter is being drained.

The base 400 is connected between and across the valve seats 120, such that the valve seats 120 are connected with the base 400 at equiangular positions (i.e. diametrically opposite positions in the present case) around the base 400.

By being located fixedly in the upstream and downstream openings 501 and 502 of the housing 500, at respective upstream and downstream positions of the pipe P relative to the overall shut-off device 10, the valve seats 120 provide immovable support for the base 400 connected therebetween and in turn sliding support for the buoyant member 200.

The operation of the shut-off device 10 is now described with reference to FIGS. 16 to 20 of the drawings.

In the initial, normal condition (FIG. 16), the buoyant member 200 together with the valve members 110 is in the lowest position under the action of gravity. Both valve members 110 are in the open position, and stay completely below and clear of the main chamber 510 of the housing 500 and hence present no obstruction to the flow of fuel gas along the passage Q through the pipe P.

In the case of accidental or unintended ingress of water, which may be caused by for example impinging water jets from burst underground water mains damaging a part of the pipeline nearby, water leaking or seeping into the pipeline will make its way to the shut-off device 10 and be collected in the bottom chamber 520 of the housing 500. As water builds up in the bottom chamber 520, the buoyant member 200 will be reached and displaced by the rising water, thereby floating on and rising with the ingress water being collected in the bottom chamber 520.

Figure 18:
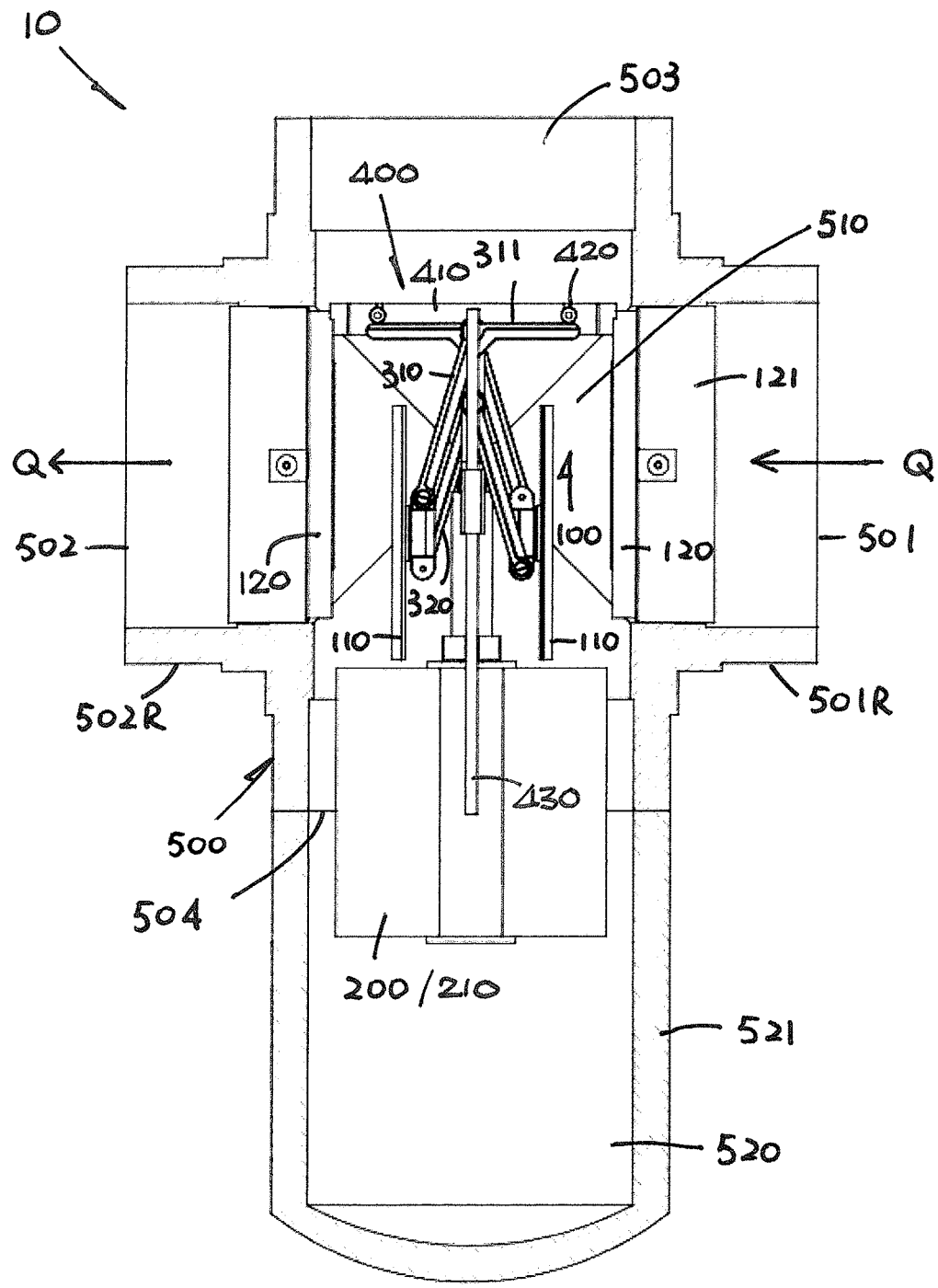

In this situation (FIG. 17), upon ingress of water W into the pipe P and being collected in the housing's bottom chamber 520, the buoyant member 200 starts to rise upon floating on the rising ingress water W and hence lift both valve members 110 supported thereon into the main chamber 510. Upon continual rising, the movable connectors 300, which connect the valve members 110 to the buoyant member 200, will have the actuating parts 311 of their first links 310 engage the abutment pins 420 of the base 400 above (FIG. 18).

Figure 19:
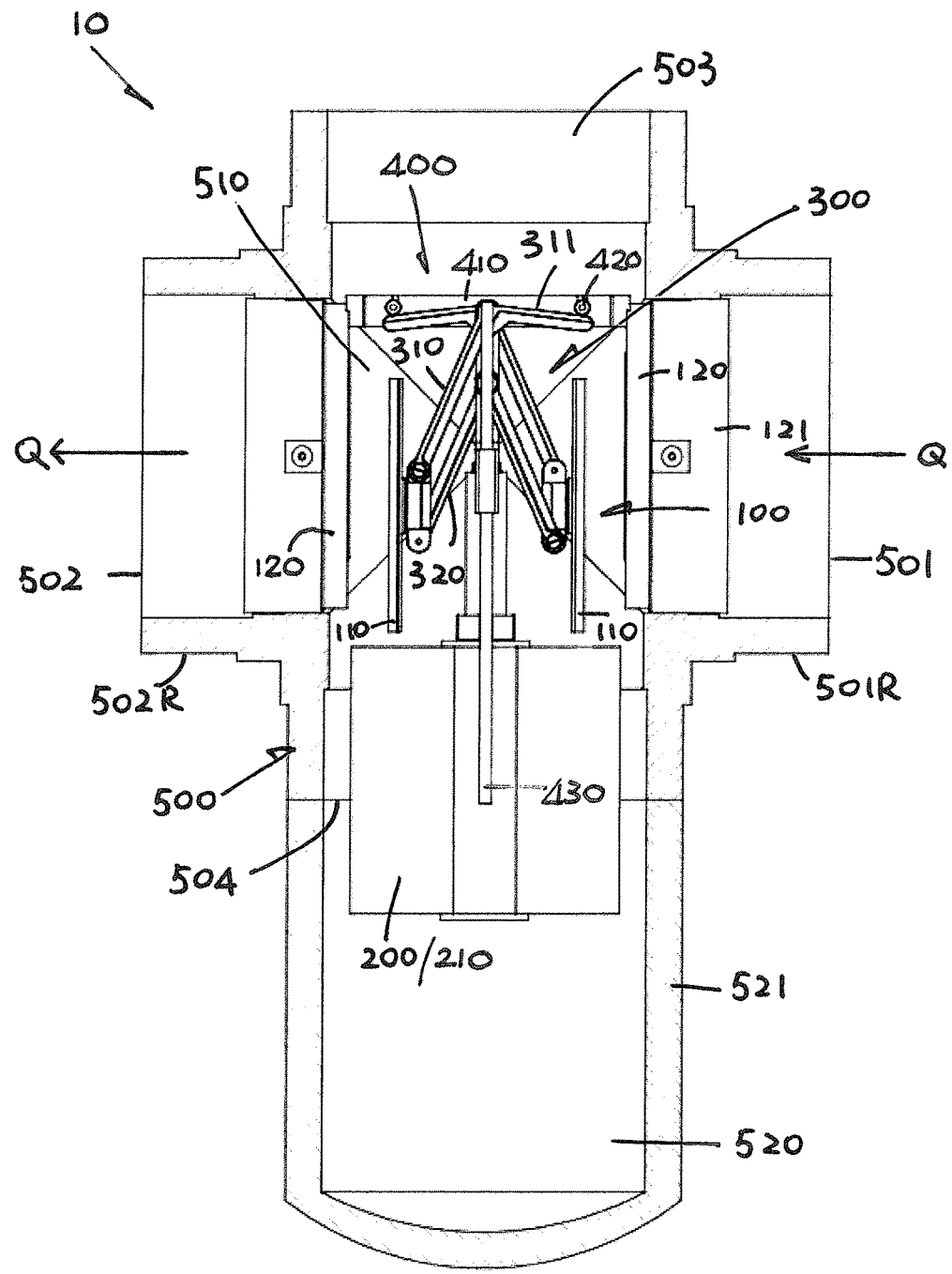
Figure 20:
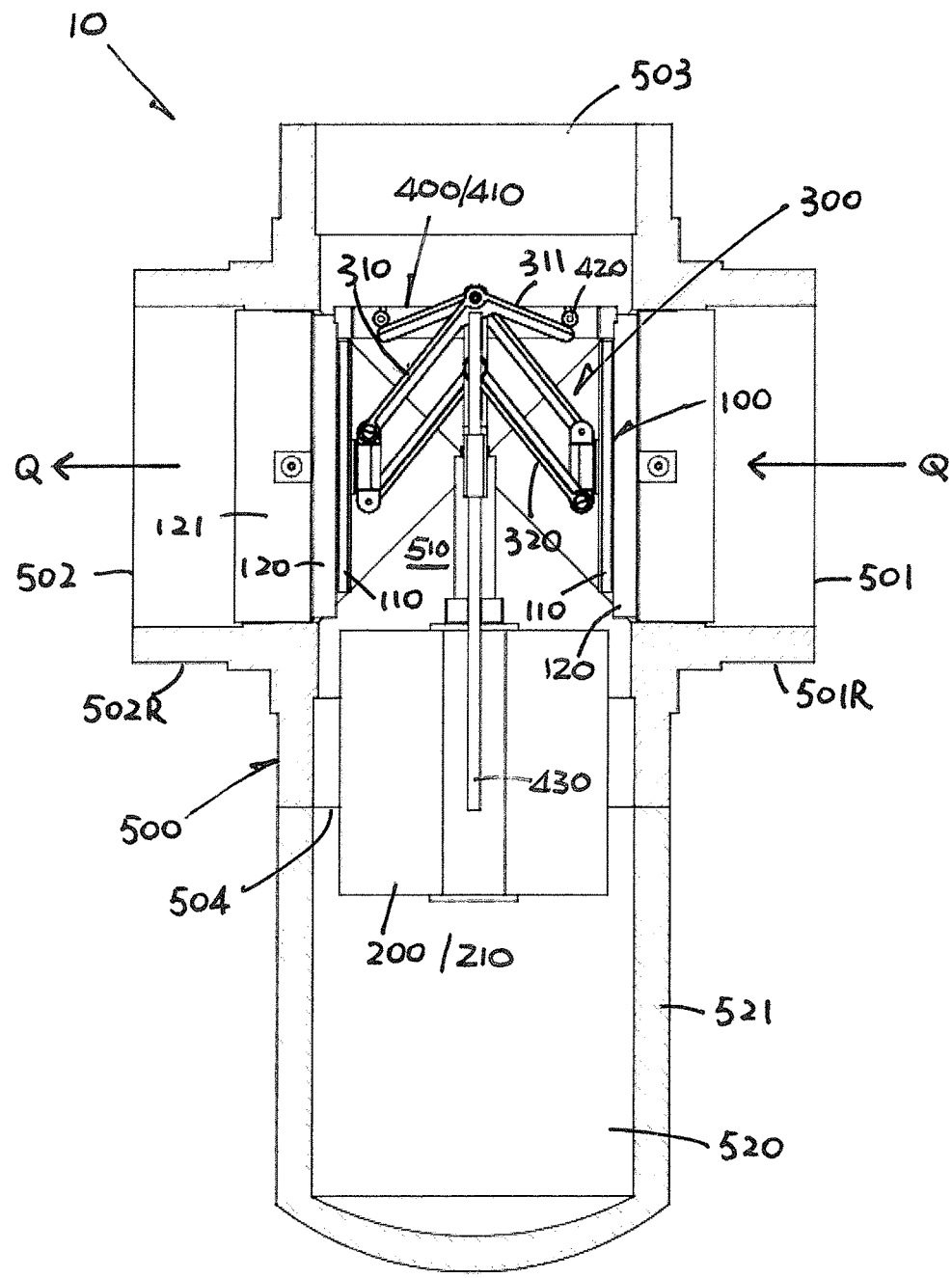

Starting from this moment, the connectors 300 are being urged against the base 400 by the buoyant member 200. This results in upward pivotal movement of the connectors 300 to in turn move or pivot the valve members 110 outwardly relative to the buoyant member 200 and towards the closed position (FIG. 19).

Finally, both valve members 110 will press tight against the respective valve seats 120 and reach their closed position, thereby shutting off the passage Q through the pipe P (FIG. 20) to terminate the flow of fuel gas as well as propagation of ingress water along the pipe P or the pipeline.

The supply of fuel gas via the passage Q is terminated. More importantly, the customers' side of the pipeline downstream of the tripped shut-off device 10 is sealed off by the closed valves 100 and hence protected against invasion by the water leaking into the pipeline on the gas supply side.

The shut-off device 10 is designed such that the valve members 110 will reach and bear against the corresponding valve seats 120, i.e. both valves 100 will be closed, before the bottom chamber 520 is completely filled up with the ingress water. This design avoids or minimizes spreading of the ingress water from the leaking side of the shut-off device 10 across to the opposite, non-leaking side.

Under the action of gravity, the valve members 110 normally stay in the open position and, subsequent to operation, will automatically return to the open position upon removal of the ingress water.

Throughout the operation, the valve members 110 are arranged, in the open position, to extend transverse to the direction of the passage Q through the pipe P and, in the closed position, also to extend transverse to the direction of the passage Q. The planar bodies of the valve members 110 are arranged to extend at a constant angle, i.e. to stay in a vertical position, perpendicular to the horizontal direction of the passage Q through the pipe P, either during operation or at rest.

In a nutshell, the valve members 110 are arranged initially to move upwardly with the buoyant member 200, as they are supported or carried by the buoyant member 200, from the open position and subsequently, upon their connectors 300 being urged against the base 400, to move outwardly relative to the buoyant member 200 and to reach the closed position. The connectors 300 are arranged to have their actuating parts 311 urged against the base 400 to cause angular movement of the links 310 and 320 and in turn pivotal movement of the valve members 110 relative to the buoyant member 200 and to reach the closed position. It is noted that the valve members 110 are arranged to move initially along a linear path, i.e. vertically upwards, from the open position and subsequently along a non-linear path, as they are being pivoted upwards and outwards, to reach the closed position.

The shut-off device 10 should be reset in order to prepare for resuming of the supply of gas via the passage Q after the leakage has been rectified, for example a damaged pipe section and/or fitting (e.g. joint) of the pipeline having been repaired or replaced. To reset the shut-off device 10, the water collected inside should be drained and the valve 100 re-opened.

The shut-off device 10 of the described embodiment is bi-directional, in that the two valve members 110 are installed in opposite directions to shut off the respective upstream and downstream directions or paths of the passage Q through the pipe P. The supply of fuel gas may be switched to come in either one of the two opposite directions, e.g. in the direction opposite to the passage Q (i.e. opposite to direction Q), without affecting the operation of the shut-off device 10.

By shutting off the pipe P in opposite directions and with the use of two valves 100, the shut-off device 10 is capable of providing an effective water blockage.

In the situation where the pressure of the ingress water is excessively high, the valve member 110 facing the inflow direction may not hold up well but the other valve member 110, which faces back, should hold up the shut-off such that the ingress water will be stopped at the housing 500. Since the ingress water is coming from the back of the other valve member 110, its pressure will act upon the back of that other valve member 110 and make it press harder against the associated valve seat 120. This is one major advantage of the shut-off device of the subject invention.

The shut-off device of the present invention incorporates more than one valve, or at least two valves, to shut off all the passages, paths or branches (i.e. pipe sections) extending to or extending from the location, which is a junction, at which the shut-off device 10 is installed. Each junction should have at least two branches, i.e. an upstream branch for the flow running to the junction and a downstream branch for the flow running from the junction. This is the simplest system, as in the case of the preferred embodiment as described above. In the situation where there are more than two branches, for example three branches comprising two upstream branches merging into one downstream branch, a shut-off device suitable for use according to the invention may include three valves. The first and second valves are installed to shut off the two upstream branches (i.e. pipe sections) respectively, and the third valve installed to shut off the downstream branch.

In closing, the shut-off device 10 is a self-contained unit for connection and use in the pipe P.

The invention has been given by way of example only, and various other modifications of and/or alterations to the described embodiment may be made by persons skilled in the art without departing from the scope of the invention as specified in the appended claims.

The invention claimed is:

1. A shut-off device comprising:
a housing including
a main chamber having at least first and second openings, providing access to the main chamber, and for respectively connecting the housing to a first pipe section of a pipeline, at an upstream side of the pipeline, and to a second pipe section of the pipeline, at a downstream side of the pipeline, wherein the main chamber provides a passage for flow of a gas from the upstream side of the pipeline to the downstream side of the pipeline, and
a bottom chamber in fluid communication with the main chamber for collecting liquid from the pipeline;
at least first and second valves located within the housing for respectively opening and closing the first and second openings of the housing, wherein
the first valve comprises a first valve member and the second valve comprises a second valve member,
the first valve member and the second valve member are supported for movement within the housing between open positions permitting the flow of the gas in the pipeline and through the passage of the housing, and closed positions blocking the respective first and second openings and preventing the flow of the gas in the pipeline and through the passage of the housing, and
at least one of the first and second valve members is completely outside the main chamber of the housing when the at least one of the first and second valve members is in the open position; and
a buoyant member, movable within the bottom chamber, and associated with the first and second valve members, for moving the first and second valve members toward and to the closed positions, from the open positions, upon collection of the liquid in the bottom chamber that lifts the buoyant member, wherein
the at least one of the first and second valve members moves initially, from the open position toward, but not reaching, the closed position, along a linear path, and
the at least one of the first and second valve members moves, subsequent to moving along the linear path, toward and reaching the closed position, along a non-linear path.

2. The shut-off device as claimed in claim 1, wherein at least one of the first and second valve members, upon movement from the open position to the closed position, moves into the passage in the main chamber of the housing.

3. The shut-off device as claimed in claim 1, wherein the first and second valve members are in the open positions when no liquid has collected in the bottom chamber and return to the open positions upon removal of liquid from the bottom chamber.

4. The shut-off device as claimed in claim 1, wherein each of the first and second openings of the housing includes pipe jointing means for connection to the first and second pipe sections, respectively.

5. The shut-off device as claimed in claim 1, wherein the bottom chamber is openable for removal of liquid collected in the bottom chamber.

6. The shut-off device as claimed in claim 1, wherein
at least one of the first and second valve members has a planar body, and,
in the open position, the planar body extends transverse to the flow of the gas through the passage of the main chamber of the housing, and,
in the closed position, the planar body extends transverse to the first and second pipe sections of the pipeline.

7. The shut-off device as claimed in claim 6, wherein the planar body of the at least one of the first and second valve members extends at a constant angle to the flow of the gas through the passage of the main chamber of the housing.

8. The shut-off device as claimed in claim 1, wherein the first and second valves include respective first and second valve seats from which the first and second valve members are respectively disengaged in the open positions, and with which the first and second valve members are respectively engaged in the closed positions.

9. The shut-off device as claimed in claim 8, wherein
the first and second valve members and the first and second valve seats have respective sealing parts for closing the first and second valves, and
at least one of the sealing parts includes at least one magnet for magnetic attraction of one of the first and second valve seats or one of the first and second valve members to hold the corresponding one of the first and second valve members in the closed position.

10. The shut-off device as claimed in claim 1, including a movable connector connecting at least one of the first and second valve members to the buoyant member and supported by the buoyant member.

11. The shut-off device as claimed in claim 10, wherein
the buoyant member has a buoyant body including a mount, and
the movable connector is pivotally connected to the mount, for movement relative to the buoyant member.

12. The shut-off device as claimed in claim 10, including a base, wherein, upon lifting of the buoyant member in the bottom chamber in response to collection of the liquid in the bottom chamber, the movable connector contacts and is urged against the base, causing the movable connector to move the at least one of the first and second valve members to the closed position.

13. The shut-off device as claimed in claim 12, wherein the at least one of the first and second valve members initially moves upwardly within the housing, with the buoyant member, from the open position and, subsequently, upon the movable connector being urged against the base, moves outwardly, relative to the buoyant member, to reach the closed position.

14. The shut-off device as claimed in claim 12, wherein the first and second valves include respective first and second valve seats from which the first and second valve members are respectively disengaged in the open positions, and with which the first and second valve members are respectively engaged in the closed positions.

15. The shut-off device as claimed in claim 14, wherein the first and second valve seats are respectively connected to the housing at equiangular positions around the first and second openings.

16. The shut-off device as claimed in claim 14, wherein the first and second valve seats are respectively connected to the housing at the first and second openings and provide immovable support for the base and sliding support for the buoyant member.

17. The shut-off device as claimed in claim 12, wherein the movable connector comprises at least one link pivotally connecting the at least one of the first and second valve members to the buoyant member for movement of the at least one of the first and second valve members relative to the buoyant member.

18. The shut-off device as claimed in claim 17, wherein the movable connector includes two links arranged in a parallel linkage, fixing an angular position of the at least one of the first and second valve members relative to the buoyant member.

19. The shut-off device as claimed in claim 17, wherein the at least one link has an actuating part for moving the at least one of the first and second valve members, relative to the buoyant member, to reach the closed position.

20. The shut-off device as claimed in claim 19, wherein the actuating part is an integral part of the at least one link.

21. The shut-off device as claimed in claim 12, wherein the base
   has an abutment against which the movable connector is urged by the buoyant member upon lifting of the buoyant member by the liquid collected in the bottom chamber, and
   includes a guide guiding movement of the buoyant member upon lifting of the buoyant member by the liquid collected in the bottom chamber.

22. The shut-off device as claimed in claim 21, wherein the buoyant member is in sliding engagement with the guide.

23. The shut-off device as claimed in claim 21, wherein the buoyant member has a buoyant body including a mount with which the guide is in sliding engagement for guiding the movement of the buoyant member.

24. The shut-off device as claimed in claim 23, wherein the guide comprises a plurality of rails, and
   the mount has respective parts in sliding engagement with the plurality of rails.

25. A shut-off device comprising:
   a housing including
      a main chamber having at least first and second openings, providing access to the main chamber, and for respectively connecting the housing to a first pipe section of a pipeline, at an upstream side of the pipeline, and to a second pipe section of the pipeline, at a downstream side of the pipeline, wherein the main chamber provides a passage for flow of a gas from the upstream side of the pipeline to the downstream side of the pipeline, and
      a bottom chamber in fluid communication with the main chamber for collecting liquid from the pipeline;
   at least first and second valves located within the housing for respectively opening and closing the first and second openings of the housing, wherein
      the first valve comprises a first valve member and the second valves comprises a second valve member,
      the first valve member and the second valve member are supported for movement within the housing between open positions permitting the flow of the gas in the pipeline through the passage of the housing, and closed positions blocking the respective first and second openings and preventing the flow of the gas in the pipeline and through the passage of the housing, and
      at least one of the first and second valve members is completely outside the main chamber of the housing when the at least one of the first and second valve members is in the open position; and
   a buoyant member, movable within the bottom chamber, and supporting the first and second valve members, for moving the first and second valve members toward and to the closed positions from the open positions upon collection of the liquid in the bottom chamber that lifts the buoyant member along a first vertical path, wherein
      the at least one of the first and second valve members is moved initially from the open position, toward, but not reaching, the closed position, along a second vertical path, and,
      the at least one of the first and second valve members, subsequent to moving along the second vertical path, is pivoted, at a constant angular position relative to the first and second vertical paths, toward and reaching the closed position.

26. The shut-off device as claimed in claim 25, including a movable connector pivotally connecting the at least one of the first and second valve members to the buoyant member, and supported by the buoyant member, wherein the movable connector includes two links arranged in a parallel linkage, fixing the angular position of the at least one of the first and second valve members, relative to the buoyant member, in pivoting of the at least one of the first and second valve members toward and reaching the closed position.

27. The shut-off device as claimed in claim 25, wherein the at least one of the first and second valve members initially moves upwardly within the housing, with the buoyant member, along the second vertical path, from the open position and, subsequently, is pivoted outwardly, relative to the buoyant member, to reach the closed position.

28. The shut-off device as claimed in claim 27, wherein at least one of the first and second valve members has a planar body, and,
   in the open position, the planar body extends transverse to the flow of the gas through the passage of the main chamber of the housing, and,
   in the closed position, the planar body extends transverse to the first and second pipe sections of the pipeline.

29. A shut-off device comprising:
   a housing including
      a main chamber having first and second openings, providing access to the main chamber, and for respectively connecting the housing to a first pipe section of a pipeline, at an upstream side of the pipeline, and to a second pipe section of the pipeline, at a downstream side of the pipeline, wherein the main chamber provides a passage for flow of a gas from the upstream side of the pipeline to the downstream side of the pipeline, and
      a bottom chamber in fluid communication with the main chamber for collecting liquid from the pipeline;
   first and second valves located within the housing for respectively opening and closing the first and second openings of the housing, wherein
      the first valve comprises a planar first valve member and the second valve comprises a planar second valve member,
      the planar first valve member and the planar second valve member are supported for movement within the housing between open positions permitting the flow of the gas in the pipeline through the passage of the housing, and closed positions blocking the respective first and second openings and preventing the flow of the gas in the pipeline and through the passage of the housing, and
      the planar first and second valve members are completely outside the main chamber of the housing when the planar first and second valve members are in the open positions; and
   a buoyant member, movable within the bottom chamber, and supporting the planar first and second valve members, for moving the planar first and second valve members toward and to the closed positions from the open positions upon collection of the liquid in the bottom chamber that lifts the buoyant member along a first path;

first and second movable connectors respectively pivotally connecting the planar first and second valve members to the buoyant member, wherein each of the first and second movable connectors includes two links arranged in a parallel linkage, fixing angular positions of the planar first and second valve members, relative to the buoyant member, in the open and closed positions, the planar first and second valve members extend transverse to the flow of the gas through the passage of the main chamber of the housing and the first and second pipe sections of the pipeline, the planar first and second valve members are moved initially from the open position, toward, but not reaching, the closed position, along a second path that is parallel to the first path, and, the planar first and second valve members, subsequent to moving along the second path, are pivoted by the first and second connector members toward and reaching the closed position.

30. The shut-off device as claimed in claim 29, including a base, wherein, upon lifting of the buoyant member in the bottom chamber in response to collection of the liquid in the bottom chamber, the first and second movable members contact and are urged against the base, causing the first and second movable connectors to pivot the planar first and second valve members toward the closed positions.

* * * * *